(12) United States Patent
Fukuda

(10) Patent No.: US 7,265,783 B2
(45) Date of Patent: Sep. 4, 2007

(54) IMAGE PICKUP APPARATUS

(75) Inventor: Hidetoshi Fukuda, Yokohama (JP)

(73) Assignee: Olympus Corporation, Tokyo (JP)

( * ) Notice: Subject to any disclaimer, the term of this patent is extended or adjusted under 35 U.S.C. 154(b) by 640 days.

(21) Appl. No.: 10/205,087

(22) Filed: Jul. 25, 2002

(65) Prior Publication Data

US 2003/0020819 A1   Jan. 30, 2003

(30) Foreign Application Priority Data

Jul. 27, 2001   (JP) ............................. 2001-228160

(51) Int. Cl.
*H04N 5/262* (2006.01)
*H04N 5/208* (2006.01)
*H04N 9/64* (2006.01)

(52) U.S. Cl. .................. 348/240.2; 348/252; 348/247; 348/281

(58) Field of Classification Search ..................... None
See application file for complete search history.

(56) References Cited

U.S. PATENT DOCUMENTS

| | | | | |
|---|---|---|---|---|
| 5,418,565 | A | * | 5/1995 | Smith ........................ 348/273 |
| 6,124,888 | A | * | 9/2000 | Terada et al. ................ 348/302 |
| 6,441,849 | B1 | * | 8/2002 | Fukuda ..................... 348/230.1 |
| 6,947,082 | B2 | * | 9/2005 | Gomi ....................... 348/240.2 |
| 2001/0030700 | A1 | * | 10/2001 | Mabuchi et al. ............. 348/302 |
| 2002/0044778 | A1 | * | 4/2002 | Suzuki ....................... 396/429 |

FOREIGN PATENT DOCUMENTS

| | | |
|---|---|---|
| EP | 0 720 388 A2 | 7/1996 |
| EP | 0 989 746 A2 | 3/2000 |
| JP | 2000-295530 | 10/2000 |

OTHER PUBLICATIONS

Nomoto et al.: "A 4 M-pixel CMD image sensor with block and skip access capability," Solid-State Circuits Conference, 1997. Digest of Technical Papers. 43$^{RD}$ ISSCC., 1997 IEEE International San Francisco, CA, USA Feb. 6-8, 1997, New York, NY, USA, IEEE, US., Feb. 6, 1997, pp. 186-187, 453 XP010218973 ISBN: 0-7803-3721-2.

* cited by examiner

*Primary Examiner*—Ngoc-Yen Vu
*Assistant Examiner*—Dillon Durnford-Geszvain
(74) *Attorney, Agent, or Firm*—Straub and Pokotylo; John C. Pokotylo

(57) ABSTRACT

A system controller controls a solid-state image pickup device so as to read pixels at a predetermined pixel skip-reading-out rate. During pixel skip-reading-out, the system controller adds up, for example, four pixels to acquire a value representative of a unit area for pixel skip-reading-out. A space between adjoining ones of pixels to be added up is set to, for example, a half of an inter-sample space, whereby an MTF of an image signal representing added pixels, which is attained at the sample rate, is set to 0. Consequently, an aliasing noise can be eliminated and deterioration in image quality can be prevented. Moreover, since four pixels are added up irrespective of a pixel skip-reading-out rate, a sensitivity will not vary.

14 Claims, 13 Drawing Sheets

PIXEL PITCH : Px

INTERVAL BETWEEN PIXELS TO BE ADDED : nPx

SAMPLING FOR SKIP-READING OUT : 2nPx

PIXEL PITCH : Px

INTERVAL BETWEEN PIXELS TO BE ADDED : nPx

SAMPLING FOR SKIP-READING OUT : 2nPx

IMAGE PICKUP APPARATUS

The present application claims the benefit of Japanese Application No. 2001-228160 filed on Jul. 27, 2001, the contents of which are incorporated by reference.

BACKGROUND OF THE INVENTION

1. Field of the Invention

The present invention relates to an image pickup apparatus, or more particularly, to an image pickup apparatus that is preferably adapted to an electronic-zooming image pickup system that employs an image pickup device.

2. Description of the Related Art

In recent years, electronic image pickup apparatuses including an electronic still camera have become popular. In the electronic image pickup apparatus, a photoelectric converting element such as a charge-coupled device (CCD) converts a subject image into an electric signal. Predetermined digital signal processing is performed on the signal, and the resultant signal is recorded on a recording medium such as a memory card. In conformity with the recent trend toward diversification, some types of electronic image pickup apparatuses include an electronic zooming facility capable of optically or electronically enlarging or reducing a subject image.

The electronic zooming facility performs image processing on a recording image signal that can be recorded using an electronic camera or an image signal recorded on a recording medium so as to electrically enlarge part of an image. The enlarged image can be displayed in a whole screen field on the display screen of an image displaying means.

Using the facility, aside from an image of a predetermined image-capturing range defined by a photographing optical system included in the electronic camera, an image produced by enlarging part of the image can be captured (picked up and recorded) or reproduced.

In recent years, there has been a marked increase in the number of pixels capable of being produced by a solid-state image pickup device that is designed for producing a still image. If the solid-state image pickup device designed for producing a still image is applied to production of a motion picture, it takes too much time to read all pixels. For this reason, the solid-state image pickup device may be scanned with the pixels produced thereby skip-read out, so that the number of acquired pixels will match an image size offered by a displaying system.

Furthermore, Japanese Unexamined Patent Application Publication No. 2000-295530 has disclosed a method for electronically zooming an image by changing a pixel skip-reading-out rate. FIG. 16A and FIG. 16B are explanatory diagrams concerning reading proposed in the publication. FIG. 16A is concerned with reading in a normal mode, while FIG. 16B is concerned with reading in a magnification-2 zoom mode.

In the normal mode, the solid-state image pickup device is scanned to read every other pixel. For example, a signal to be read represents pixels depicted with squares painted in black within a range defined with bold-lines in FIG. 16A. specifically, reading is performed at a pixel skip-reading-out rate of 2, that is, a signal representing a matrix of pixels arrayed in four rows and four columns is read from a range covering pixels arrayed in eight rows and eight columns. Thus, the number of read pixels is diminished in order to shorten a reading time and a signal processing time.

In contrast, as shown in FIG. 16B, when the zoom mode is designated, a matrix of consecutive pixels arrayed in four rows and four columns (part of FIG. 16B painted in black) is read from the center of the range that contains a matrix of pixels arrayed in eight rows and eight columns and that is defined with bold lines. Namely, in this case, reading is performed at a skip-reading-out rate of 1. Consequently, the center of the range defined with the bold lines can be displayed in enlargement. Moreover, the number of pixels to be read is the same as that in the normal mode. The same reading time and signal processing time as those required in the normal mode are spent. Thus, the same signal processing can be shared between the normal mode and zoom mode.

By the way, when the solid-state image pickup device is used to sample an image, an aliasing noise is produced. The aliasing noise is visualized as, for example, a moiré and deteriorates the image quality terribly. Normally, an optical low-pass filter is included for minimizing the aliasing noise.

An optical low-pass filter making a modulation transfer function (MTF) zero at a sample rate at which the image is sampled is generally selected considering the characteristic of the low-pass filter.

However, the optical low-pass filter is not designed to cope with pixel skip-reading-out. During pixel skip-reading-out, the sample rate is low. An aliasing noise of a relatively high level is superposed in a low-frequency component, whereby image quality deteriorates terribly.

SUMMARY OF THE INVENTION

Accordingly, an object of the present invention is to provide an image pickup apparatus capable of suppressing deterioration in image quality even when pixels are skip-read out from a solid-state image pickup device.

Another object of the present invention is to provide an image pickup apparatus capable of preventing a change in a sensitivity even when pixels are added up in order to prevent deterioration in image quality stemming from pixel skip-reading-out.

According to the present invention, there is provided an image pickup apparatus consisting mainly of a solid-state image pickup device and a reading means. The solid-state image pickup device has a plurality of photoelectric converting elements arrayed two-dimensionally, and pixels can be skip-read out from the photoelectric converting elements. When pixels are skip-read out from the photoelectric converting elements, the reading means adds up a plurality of pixels to acquire a value representative of a unit area for pixel skip-reading-out defined based on a pixel skip-reading-out rate.

The above and other objects of the present invention and the features and advantages thereof will be more clearly understood from the following description made with reference to the accompanying drawings.

BRIEF DESCRIPTION OF THE DRAWINGS

FIG. 5 is an explanatory diagram concerning an example of a method of selecting pixels to be added up during pixel skip-reading-out;

FIG. 6 is an explanatory diagram concerning an example of a method of selecting pixels to be added up during pixel skip-reading-out;

FIG. 7 is an explanatory diagram concerning an example of a method of selecting pixels to be added up during pixel skip-reading-out;

FIG. 8 is an explanatory diagram concerning an example of a method of selecting pixels to be added up during pixel skip-reading-out;

FIG. 9 is an explanatory diagram concerning an example of a method of selecting pixels, which are added up during three-pixels addition, from among pixels arrayed in the Bayer pattern;

FIG. 10 is an explanatory diagram concerning an example of a method of selecting pixels, which are added up during three-pixels addition, from among pixels arrayed in the Bayer pattern;

FIG. 11 is an explanatory diagram concerning an example of a method of selecting pixels, which are added up during three-pixels addition, from among pixels arrayed in the Bayer pattern;

FIG. 12 is an explanatory diagram concerning an example of a method of selecting pixels, which are added up during two-pixels addition, from among pixels arrayed in the Bayer pattern;

FIG. 13A and FIG. 13B are explanatory diagrams concerning an example of weighting that is performed during pixel addition;

FIG. 13A is an explanatory diagram showing an example of four-pixels addition for half pixel skip-reading-out;

FIG. 13B is an explanatory diagram concerning weighting to be performed on pixels selected as shown in FIG. 13A;

FIG. 14A and FIG. 14B are explanatory diagrams concerning an example of weighting that is performed during pixel addition;

FIG. 14A is an explanatory diagram showing an example of four-pixels addition for quarter pixel skip-reading-out;

FIG. 14B is an explanatory diagram concerning weighting to be performed on pixels selected as shown in FIG. 14A;

FIG. 16A is an explanatory diagram concerning reading in a normal mode; and

FIG. 16B is an explanatory diagram concerning reading in a magnification-2 zoom mode.

DESCRIPTION OF THE PREFERRED EMBODIMENTS

Figure 1:
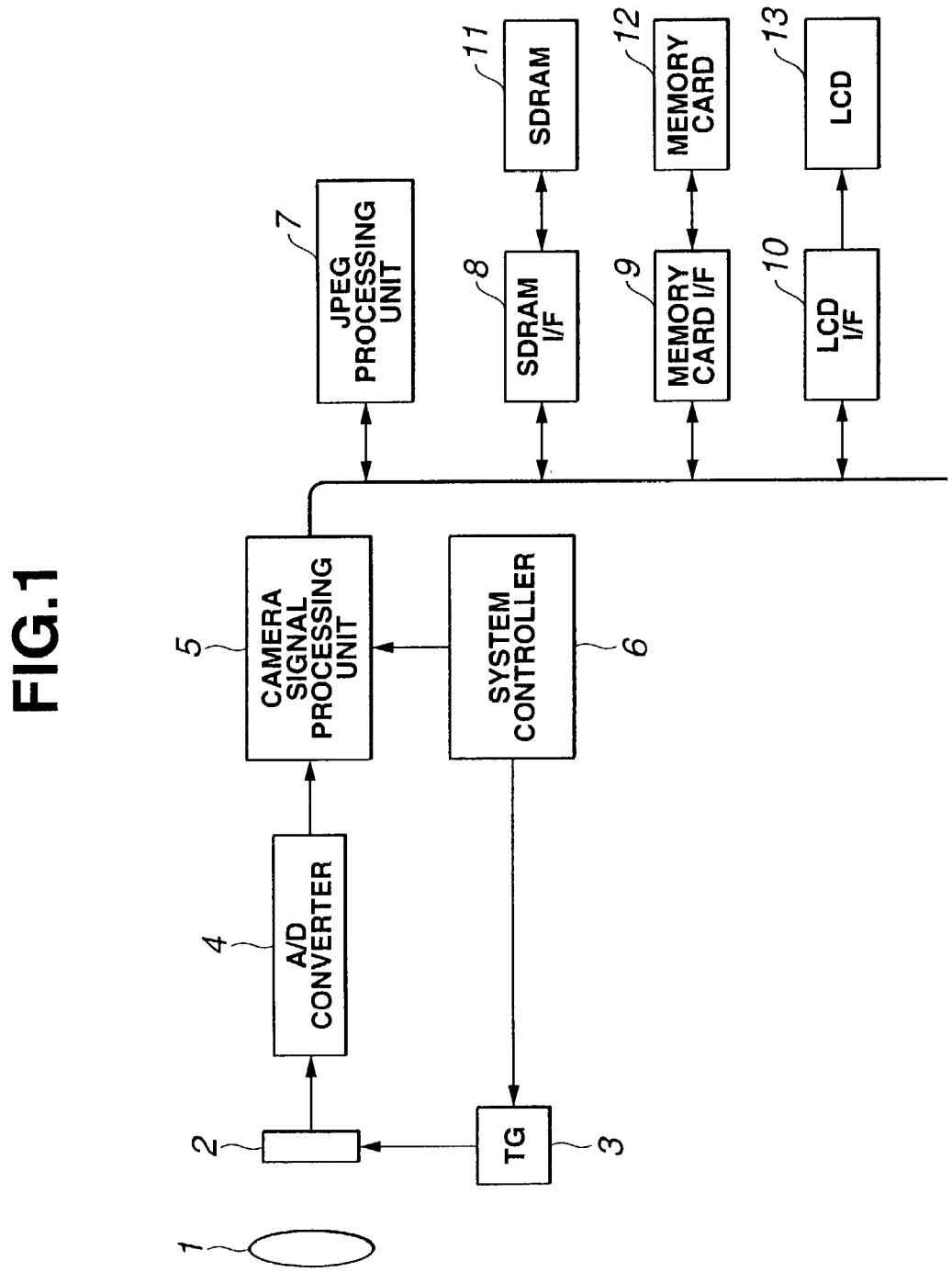
FIG. 1 is a block diagram showing an image pickup apparatus in accordance with the first embodiment of the present invention.

Embodiments of the present invention will be described with reference to the drawings below. FIG. 1 is a block diagram showing an image pickup apparatus in accordance with the first embodiment of the present invention.

According to the present embodiment, when pixel skip-reading-out is performed, pixel addition is carried out in order to suppress deterioration in image quality.

Referring to FIG. 1, an optical system 1 including an image pickup lens and an optical viewfinder forms an optical image of an object and introduces the optical image to the incidence surface of a solid-state image pickup device 2. The solid-state image pickup device 2 has a plurality of photoelectric converting elements arrayed two-dimensionally, and includes CMOS sensors that can be randomly accessed. Any of the CMOS sensors is accessed by designating x and y addresses, whereby any pixel is read (from a photoelectric converting element). A sensor drive circuit (TG) 3 controls driving of the solid-state image pickup device 2 under the control of a system controller 6.

According to the present embodiment, pixel addition is performed as described later. A preferable image pickup device is therefore such that selected pixels are added up and an addition circuit is unnecessary. For example, a charge modulation device (CMD) may be adopted as an image pickup device of a current reading type.

Figure 2:
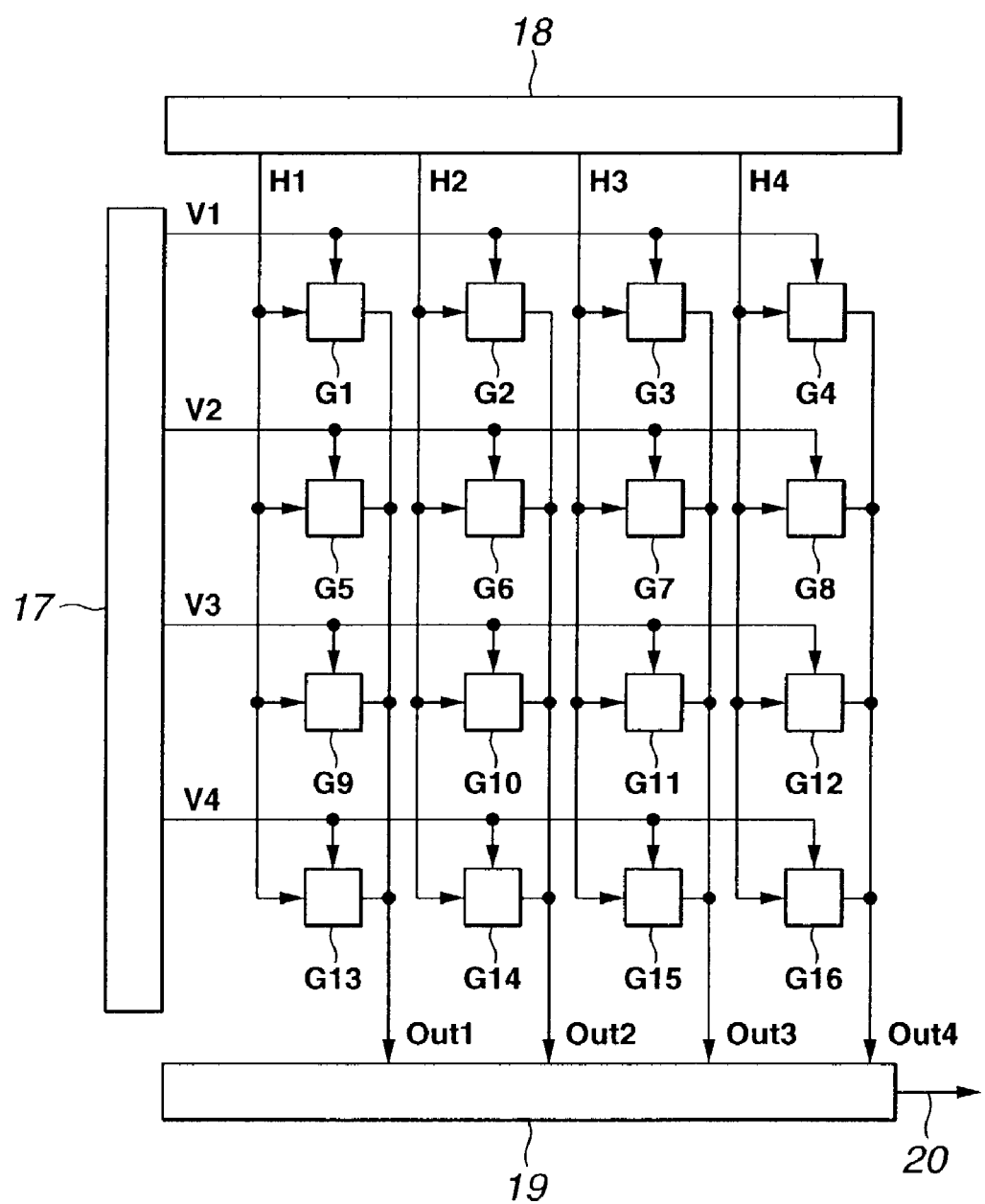
FIG. 2 is an explanatory diagram showing a practical configuration of a solid-state image pickup device shown in FIG. 1.

FIG. 2 is an explanatory diagram showing a practical configuration of the solid-state image pickup device 2 shown in FIG. 1. The solid-state image pickup device 2 includes the photoelectric converting elements G1 to G16 that are arrayed two-dimensionally and can be randomly accessed. The photoelectric converting elements G1 to G16 photoelectrically convert incident light. When a scan line V is activated by a vertical shift register 17 and a data line H is activated by a horizontal shift register 18, any of the photoelectric converting elements G1 to G16 is selected. An output resulting from photoelectric conversion is then placed on an output line Out. A line memory 19 holds outputs of any of the photoelectric converting elements G1 to G16 that form one line, and transfers them time-sequentially.

In general, the number of pixels that can be produced by the solid-state image pickup device 2 is several ten thousands to several millions. For brevity's sake, FIG. 2 shows a matrix of pixels in only four rows and four columns.

A signal read from the solid-state image pickup device 2 is transferred to an analog-to-digital (A/D) converter 4. The A/D converter 4 converts a received analog image signal into a digital signal and transfers the digital signal to a camera signal processor 5. The camera signal processor 5 performs predetermined digital signal processing on the received signal under the control of the system controller 6. The predetermined digital signal processing includes signal amplification, processing of a luminance signal, production of a color signal, matrix transform, and enhancement of a high-frequency component of a luminance signal. The camera signal processor 5 outputs a digitized signal under the control of the system controller 6.

The signal digitized by the camera signal processor 5 is transferred to respective components via a bus. A liquid crystal display (LCD) interface 10 transfers the image signal received from the camera signal processor 5 to a liquid crystal display (LCD) 13. The LCD 13 displays an image on the display screen that is not shown.

A synchronous dynamic random access memory (SDRAM) interface 8 transfers and receives a signal to or from an SDRAM 11 via the bus. The SDRAM 11 is a memory to be used for image processing. A JPEG processor 7 compresses an image signal received via the bus according to the standards recommended by the Joint Photographic Experts Group (JPEG). A memory card interface 9 transfers or receives a signal to or from a memory card 12 via the bus. The image signal compressed by the JPEG processor 7 is saved on a memory card 12.

The system controller 6 acts responsively to a maneuver performed by an operator who is not shown, and controls all the components in an overall manner. According to the present embodiment, when zooming is designated, the system controller 6 acts as the conventional manner. Specifically, the system controller 6 changes an area (which shall be referred to as an image pickup area), which is defined with photoelectric converting elements in the solid-state image pickup device 2 from which pixels are read, according to a zooming rate. Moreover, the system controller 6 changes a pixel skip-reading-out rate according to the size of the image pickup area.

Figure 3:
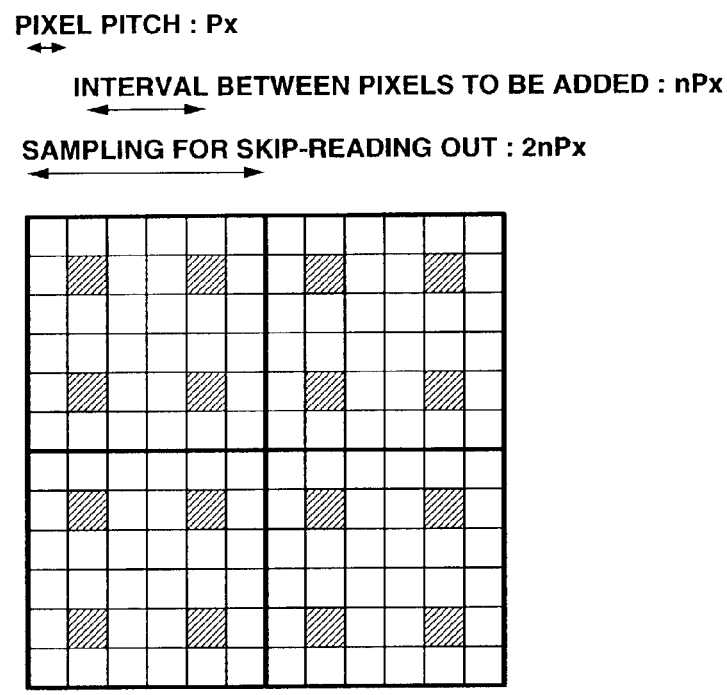
FIG. 3 is an explanatory diagram concerning a method of adding up pixels adapted to the first embodiment of the present invention.
Figure 4:
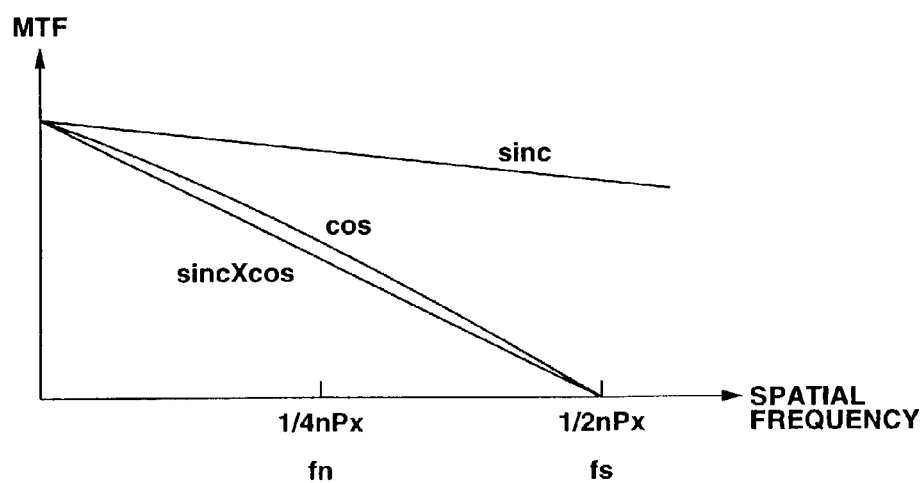
FIG. 4 is a graph for explaining the effect of pixel addition described in conjunction with FIG. 3.

According to the present embodiment, the system controller 6 controls the solid-state image pickup device 2 so that pixel addition will be performed during pixel skip-reading-out. FIG. 3 is an explanatory diagram concerning a method of pixel addition adapted to the present embodiment. FIG. 4 is a graph for explaining an effect of pixel addition to be described in conjunction with FIG. 3.

FIG. 3 shows a predetermined matrix of pixels arrayed in twelve rows and twelve columns in the solid-state image pickup device 2. In FIG. 3, hatched parts indicate pixels. Each rectangle outlined with bold lines expresses a unit area for pixel skip-reading-out in units of which pixel skip-reading-out is performed. Specifically, FIG. 3 is concerned with reading to be performed at a pixel skip-reading-out rate of 6. The reading is performed in order to acquire an image signal representing one pixel from an area that is depicted as a rectangle outlined with bold lines and that contains a matrix of pixels arrayed in six rows and six columns.

According to the present embodiment, four pixels depicted as hatched parts are selected from each area containing a matrix of pixels arrays in six rows and six columns. The four pixel values are added up. Assume that a pitch of one pixel is Px and a space in a horizontal or vertical direction between adjoining pixels to be added up is an n multiple of the pitch Px (a triple in FIG. 3). In this case, when four pixels are selected from a unit area for pixel skip-reading-out and adding up, an inter-sample space in the horizontal and vertical direction required when pixel skip-reading-out is performed is 2nPx.

Assuming that each pixel is a rectangle and an aperture ratio is 100%, an effective aperture in a horizontal direction of an image composed of pixels each of which is produced by adding up four pixels is provided as a formula (1) using a rect function and a δδ function. Herein, * signifies convolution.

$$\text{rect}(x/Px) * \delta\delta[x/nPx/2] \quad (1)$$

When the rect function and a δδ function are Fourier-transformed, a formula (2) giving a modulation transfer function (MTF) is provided as follows:

$$\text{sinc}(Pxf) \times \cos(nPx\pi f) \quad (2)$$

Referring to FIG. 4, the axis of abscissas indicates a spatial frequency, and the axis of ordinates indicates the MTF. A sinc function, a cosine, and the function sinc×cos expressed as the formula (2) are graphically shown. As seen from FIG. 4, when four-pixels addition is performed, the MTF is 0 at a spatial frequency of ½nPx.

As apparent from the formula (2), as long as the space between adjoining ones of pixels to be added up is set to a half of an inter-sample space, whatever value the inter-sample space assumes, a low-frequency aliasing noise can be suppressed.

(A) When two pixels selected with a space nPx (n multiple of a pixel pitch) between them are added up, the MTF becomes 0 at a spatial frequency of ½nPx.

(B) In other words, when two pixels selected with the space nPx (n multiple of a pixel pitch) between them are added up, pixel skip-reading-out can be achieved to such an extent that a spatial frequency is lowered to ½n. Incidentally, a Nyquist interval corresponds to ¼nPx.

Next, actions to be performed in the present embodiment having the foregoing components will be described below.

The system controller 6 defines an image pickup area in the solid-state image pickup device 2 in response to an operator's zooming instruction. Moreover, the system controller 6 determines a pixel skip-reading-out rate that depends on the size of the image pickup area. For brevity's sake, assume that the photoelectric converting elements included in the solid-state image pickup device 2 are monochrome converting elements, one photoelectric converting element produces one pixel, and the number of photoelectric converting elements is a product of 12 by 12. Moreover, an output image size required by the LCD 13 corresponds to a matrix of pixels arrayed in two rows and two columns.

For example, assume that the whole screen field of the solid-state image pickup device 2 covering all the pixel locations in the solid-state image pickup device 2 is defined as an image pickup area, and that the system controller 6 reads pixels at a pixel skip-reading-out rate of 6. Specifically, when the whole screen field of the solid-state image pickup device 2 covering all the pixel locations in the solid-state image pickup device 2 is defined as an image pickup area, a matrix of pixels arrayed in two rows and two columns is read from the solid-state image pickup device 2. In contrast, assume that a center area containing the matrix of pixels arrayed in two rows and two columns within the whole screen field of the solid-state image pickup device 2 is defined as an image pickup area, and that the system controller 6 reads the image pickup area at a pixel skip-reading-out rate of 1. In this case, an image is displayed while being zoomed at a magnification of 6 compared with an image displayed when the whole screen field is defined as an image pickup area. Even in this case, the number of pixels to be read from the solid-state image pickup device 2 is the same as that to be read when the whole screen field is defined as an image pickup area.

The system controller 6 changes the size of an image pickup area and reads the image pickup area at a pixel skip-reading-out rate dependent on the size. The system controller 6 then performs common signal processing to produce a zoomed image. An image signal read from the solid-state image pickup device 2 is converted into a digital form by the A/D converter 4. The resultant signal is transferred to the camera signal processor 5. The camera signal processor 5 performs predetermined signal processing and places the resultant signal on the bus. For example, the LCD 13 fetches an image signal via an LCD interface 10 and displays an image on the display screen thereof.

The system controller 6 transfers a produced image to the JPEG processor 7 in response to an operator's instruction. The image signal is then compressed and recorded on the memory card 12 via the memory card interface 9.

According to the present embodiment, when the system controller 6 skip-reads out pixels from the solid-state image pickup device 2, the system controller 6 selects four pixels from each unit area for pixel skip-reading-out with a space dependent on a pixel skip-reading-out rate between adjoining pixels. The system controller 6 then adds up the four pixels and permits acquisition of a calculated pixel value. Preferably, a space comparable to a half of the inter-sample space is present between adjoining ones of four pixels to be selected from each unit area for pixel skip-reading-out, and the four pixels are values of representative of the unit area for pixel skip-reading-out.

For example, assuming that the solid-state image pickup device 2 is of an electric current reading type, two scan lines and two data lines are activated simultaneously for each unit area for pixel skip-reading-out. Rows in FIG. 3 shall be associated with scan lines V1 to V12, and columns therein shall be associated with data lines H1 to H12. In this case, when pixels are read from a unit area for pixel skip-reading-out indicated with the left upper square in FIG. 3, the scan lines V2 and V5 and the data lines H2 and H5 are activated simultaneously. Consequently, pixels depicted as hatched parts of FIG. 3 are added up and read.

Even when pixel skip-reading-out is performed, the space comparable to a half of the inter-sample space lies between adjoining ones of four pixels to be selected. As described in (A) and (B), the MTF becomes 0 at the sample rate. This results in satisfactory image quality with an aliasing noise minimized.

As mentioned above, according to the present embodiment, four pixels having the space comparable to a half of the inter-sample space between adjoining ones are selected and added up. Even when pixel skip-reading-out is performed, the adverse effect of an aliasing noise can be minimized, and occurrence of a moiré can be prevented. This results in satisfactory image quality.

The foregoing embodiment has been described on the assumption that four pixels are selected from each unit area for pixel skip-reading-out. The number of pixels to be added up is not limited to four but may be set to any value.

In order to cope with an aliasing noise, all pixels contained in each unit area for pixel skip-reading-out should be selected and added up. However, in this case, every time a zooming magnification is changed, the number of pixels to be added up varies and a sensitivity varies. Therefore, in this case, every time the zooming magnification is changed, the sensitivity must be corrected. However, in the present embodiment, the number of pixels to be added up is fixed to four irrespective of a pixel skip-reading-out rate. The sensitivity will not vary depending on the pixel skip-reading-out rate, and the same signal processing can be used in common as a subsequent step of signal processing.

Moreover, a dynamic range of a sensor circuit must be widened proportionally to the number of pixels to be added up. According to the present embodiment, the number of pixels to be added up is fixed to a relatively small value. The dynamic range to be offered by the sensor circuit may be set to a relatively narrow range. Moreover, the setting need not be changed.

According to the present embodiment, an image pickup device of an electric current reading type should be adopted. Using the image pickup device of an electric current reading type, the image pickup device can perform addition of pixels during pixel addition. This obviates the necessity of an addition circuit. Moreover, if an image pickup device of a voltage reading type is adopted, a larger number of pixels must be read from the image pickup device. This leads to a lower frame rate. In the present embodiment, the number of pixels to be read is fixed to a relatively small value. The decrease in the frame rate can therefore be prevented.

The present invention has been described on the assumption that the photoelectric converting elements are realized with monochrome converting elements. For production of a color image, however, each pixel must be composed of color pixels. When a so-called triple image pickup device composed of three image pickup devices associated with red, green, and blue is adopted, an image pickup apparatus may be configured similarly as it is when the monochrome converting elements are adopted. However, when a singular color image pickup device is adopted, a spatial position indicated by a signal representing an image resulting from pixel addition performed may be different color by color from an ideal spatial position. Moreover, in the case of the singular color image pickup device, an MTF relative to an image resulting from pixel addition performed may vary color by color depending on a pixel skip-reading-out rate. Therefore, pixels to be selected must be determined in consideration of the arrangement of a plurality of color pixels required to produce a color signal.

FIG. 5 to FIG. 8 are explanatory diagrams concerning a method of selecting pixels to be added during pixel skip-reading-out which is employed when the present invention is implemented in a singular color image pickup device. Referring to FIG. 5 to FIG. 8, rectangles depict pixels, and R, G, or B written in a rectangle means a red pixel, a green pixel, or a blue pixel. FIG. 5 to FIG. 8 are examples of the popular Bayer pattern having a matrix of four pixels, that is, one red pixel, two green pixels, and one blue pixel arrayed repeatedly. Incidentally, pixels to be added up are indicated with a round mark O.

In FIG. 5 to FIG. 8, rectangles outlined with bold lines express unit areas for pixel skip-reading-out. Pixels to be read from each unit area for pixel skip-reading-out are selected so that they will also be arrayed in the Bayer pattern. Specifically, referring to FIG. 5 to FIG. 8, rightward ascending lines within a rectangle outlined with bold lines express a unit area for pixel skip-reading-out from which a red pixel is acquired. Leftward ascending lines express a unit area for pixel skip-reading-out from which a blue pixel is acquired. A rectangle outlined with bold lines but devoid of ascending or descending lines expresses a unit area for pixel skip-reading-out from which a green pixel is acquired.

In subsequent drawings, G1, B1, R1, and G2 denote examples of pixels to be added up. In the drawings, other pixels to be added up are selected similarly to the pixels G1, B1, R1, and G2.

Figure 5:
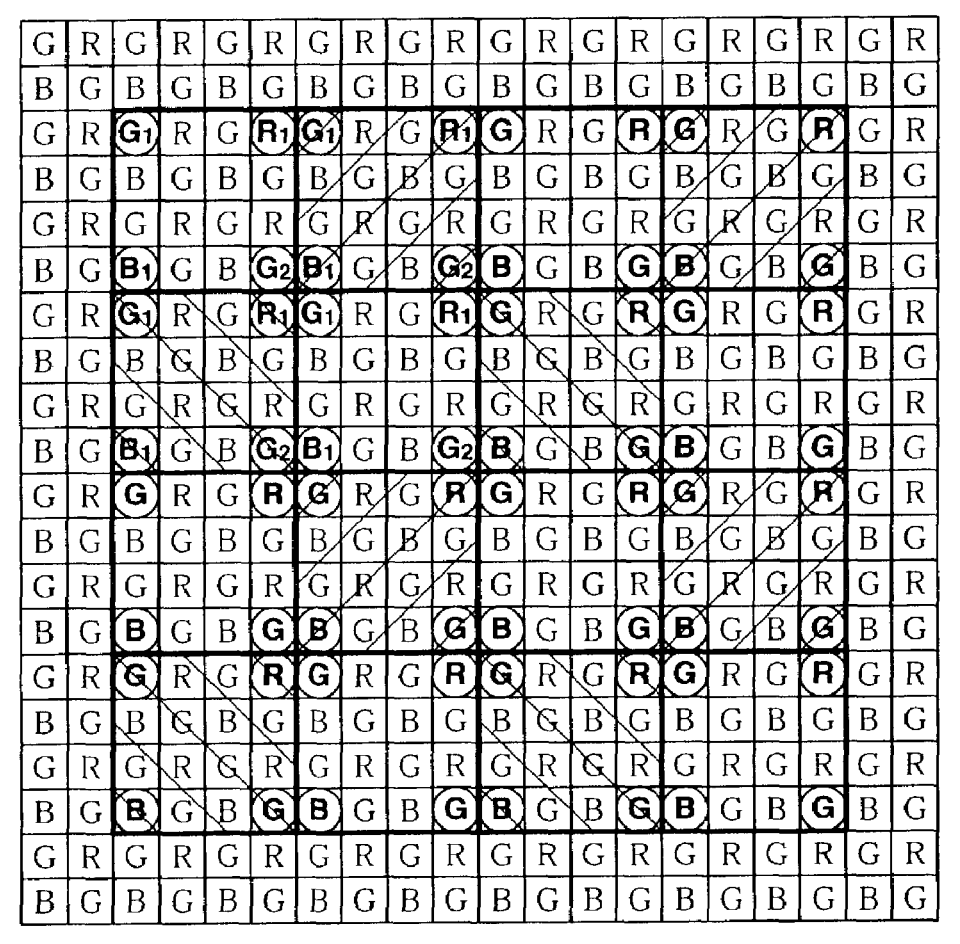

FIG. 5 shows an example of pixels to be added up after selected at a pixel skip-reading-out rate of 4 (this pixel skip-reading-out may be referred to as quarter pixel skip-reading-out). In FIG. 5, the rectangles outlined with bold lines express unit areas for pixel skip-reading-out. For production of a color image, the pixels are manipulated color by color. Pixel skip-reading-out is performed on every fourth pixels, that is, on a pixel lying on the perimeter of each unit area for pixel skip-reading-out expressed as a rectangle outlined with bold lines. Talking of pixels of each color produced in each unit area for pixel skip-reading-out, every eighth pixel is read (in other words, the pixels of each color in each unit area for pixel skip-reading-out are read at intervals of a pitch of eight pixels).

As mentioned above, reading should be performed with a space, which is comparable to a half of an inter-sample space between adjoining ones of pixels to be read. In terms of each color, pixels of each color are selected at intervals of a pitch of four pixels and added up. In the example of FIG. 5, for example, for a unit area for pixel skip-reading-out expressed as the leftmost uppermost rectangle outlined with bold lines, four green pixels G1 selected at intervals of the pitch of four pixels are added up and acquired. Moreover, for a unit area for pixel skip-reading-out expressed as the uppermost second leftmost rectangle outlined with bold lines, four red pixels R1 selected at intervals of the pitch of four pixels are added up and acquired. For a unit area for pixel skip-reading-out expressed as the leftmost second uppermost rectangle outlined with bold lines, four blue pixels B1 selected at intervals of the pitch of four pixels are added up and acquired. Moreover, for a unit area for pixel skip-reading-out expressed as the second leftmost second uppermost rectangle outlined with bold lines, four green pixels G2 selected at intervals of the pitch of four pixels are added up and acquired.

Figure 6:
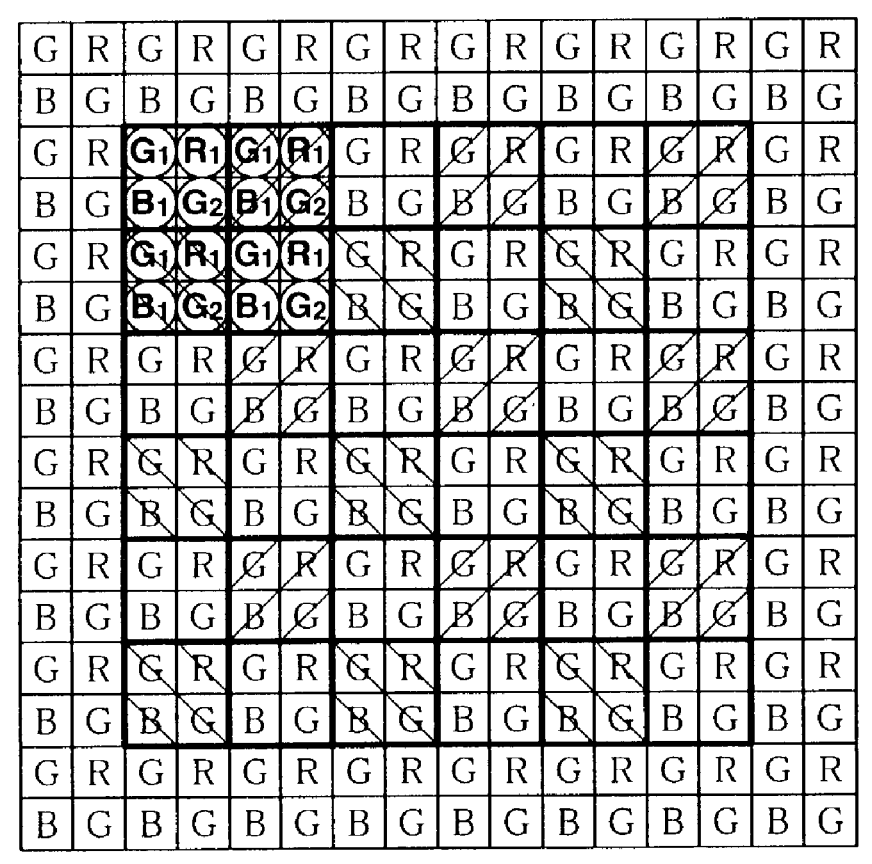

FIG. 6 shows an example of pixels to be added after selected at a pixel skip-reading-out rate of 2 (this pixel skip-reading-out may be referred to as half pixel skip-reading-out). Each rectangle outlined with bold lines in FIG. 6 expresses a unit area for pixel skip-reading-out containing a matrix of pixels arrayed in two rows and two columns. Pixel skip-reading-out is performed on every other pixel, that is, on a pixel lying on the perimeter of each unit area for pixel skip-reading-out expressed as a rectangle outlined with bold lines. Talking of pixels of each color produced in each unit area for pixel skip-reading-out, pixels of each color are read at intervals of a pitch of four pixels.

Consequently, pixels should be selected with a space, which is comparable to a half of an inter-sample space between adjoining ones, and then added up. In terms of each color, pixels of each color should be selected at intervals of a pitch of two pixels and added up. In the example of FIG. 6, four pixels lying at the corners of each unit area for pixel skip-reading-out are added up. For example, for a unit area for pixel skip-reading-out expressed as the leftmost uppermost rectangle outlined with bold lines, four green pixels G1 selected at intervals of the pitch of two pixels are added up and acquired. For a unit area for pixel skip-reading-out expressed as the uppermost second leftmost rectangle outlined with bold lines, four red pixels R1 selected at intervals of the pitch of two pixels are added up and acquired. For a unit area for pixel skip-reading-out expressed as the leftmost second uppermost rectangle outlined with bold lines, four blue pixels B1 selected at intervals of the pitch of two pixels are added up and acquired. For a unit area for pixel skip-reading-out expressed as the second leftmost second uppermost rectangle outlined with bold lines, four green pixels G2 selected at intervals of the pitch of two pixels are added up and acquired.

In the examples of FIG. 5 and FIG. 6, whatever unit area for pixel skip-reading-out is concerned, an average of the locations of four pixels to be added up approaches approximately to a barycenter in the unit area for pixel skip-reading-out. Consequently, the result of addition is thought appropriate as a value representative of the unit area for pixel skip-reading-out. Whatever unit area for pixel skip-reading-out is concerned, pixels are selected with a space, which is comparable to a half of an inter-sample space between adjoining ones, and then added up. An MTF to be attained at the sample rate will therefore be 0. Consequently, the adverse effect of an aliasing noise can be suppressed.

Figure 7:
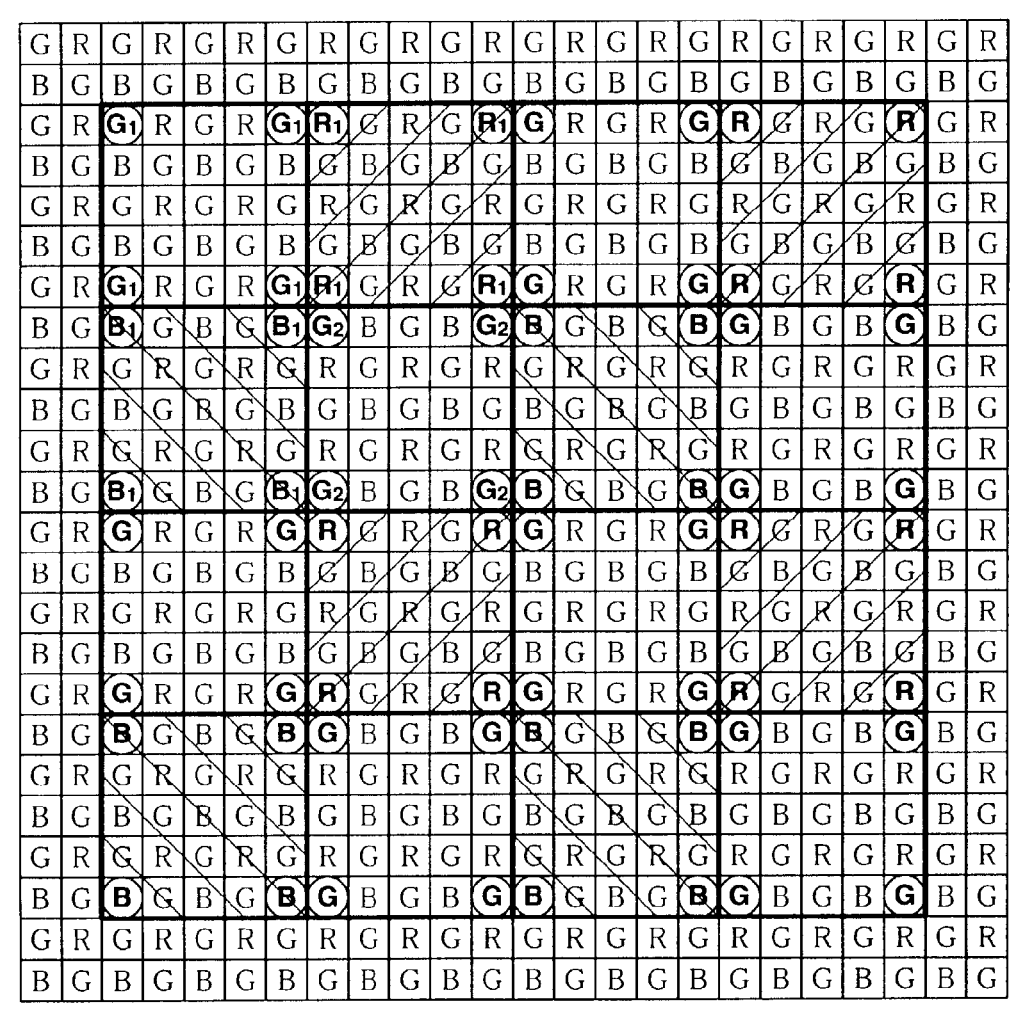

FIG. 7 shows an example of pixels to be added after being selected at a pixel skip-reading-out rate of 5 (this pixel skip-reading-out may be referred to as one-fifth pixel skip-reading-out). Each rectangle outlined with bold lines in FIG. 7 expresses a unit area for pixel skip-reading-out containing a matrix of pixels arrayed in five rows and five columns. Pixel skip-reading-out is performed on every fifth pixel, that is, on a pixel lying in the perimeter of a unit area for pixel skip-reading-out expressed as a rectangle outlined with bold lines. Talking of pixels of each color produced in each unit area for pixel skip-reading-out, pixels of each color are read at intervals of a pitch of ten pixels.

Consequently, pixels should be selected with a space, which is comparable to a half of an inter-sample space between adjoining ones, and added up. In terms of each color, pixels of each color should be selected at intervals of a pitch of five pixels and then added up. However, a pixel of the same color is produced at every other pixel location. Pixels of the same color to be added up cannot be selected at intervals of the pitch of five pixels. The aforesaid ideal characteristic making an MTF zero at a sample rate cannot be realized, but a characteristic of relatively diminishing the MTF to be attained at the sample rate may be realized through addition of pixels selected at intervals of a pitch of four pixels. That is to say, a space between adjoining ones of pixels to be added is set to a difference of (a half of an inter-sample space)−1.

In the example of FIG. 7, four pixels lying at the corners of each unit area for pixel skip-reading-out are added up. For example, for a unit area for pixel skip-reading-out expressed as the leftmost uppermost rectangle outlined with bold lines, four green pixels G1 selected at intervals of a pitch of four pixels are added up and acquired. For a unit area for pixel skip-reading-out expressed as the uppermost second leftmost square, four red pixels R1 selected at intervals of the pitch of four pixels are added up and acquired. For a unit area for pixel skip-reading-out expressed as the leftmost second uppermost rectangle outlined with bold lines, four blue pixels B1 selected at intervals of the pitch of four pixels are added up and acquired. For a unit area for pixel skip-reading-out expressed as the second leftmost second uppermost rectangle outlined with bold lines, four green pixels G2 selected at intervals of the pitch of four pixels are added up and acquired.

Figures 8, 9:
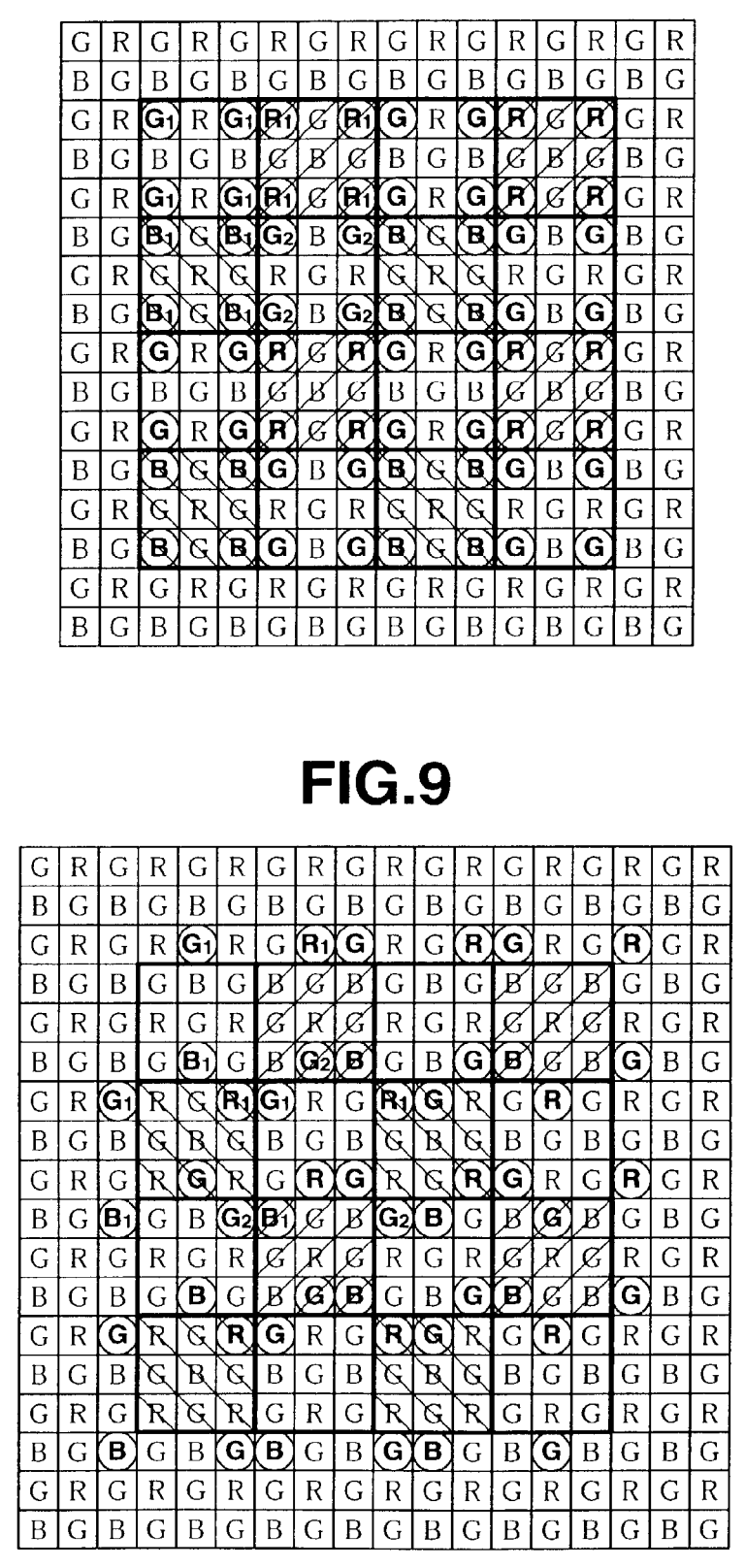

FIG. 8 shows an example of pixels to be added after being selected at a pixel skip-reading-out rate of 3 (this pixel skip-reading-out may be referred to as one-third pixel skip-reading-out). Each rectangle outlined with bold lines in FIG. 8 expresses a unit area for pixel skip-reading-out containing a matrix of pixels arrayed in three rows and three columns. Pixel skip-reading-out is performed on every third pixel, that is, on a pixel lying in the perimeter of each unit area for pixel skip-reading-out expressed as a rectangle outlined with bold lines. However, talking of pixels of each color produced in each unit area for pixel skip-reading-out, pixels of each color are read at intervals of a pitch of six pixels.

Consequently, pixels to be added up should be selected with a space, which is comparable to a half of an inter-sample space between adjoining ones. In terms of each color, pixels of each color to be added up should be selected at intervals of a pitch of three pixels. Even in this case, pixels of the same color to be added up cannot be selected at intervals of the pitch of three pixels. Therefore, pixels selected at intervals of a pitch of two pixels are added up. Namely, a space between adjoining ones of pixels to be added up is set to a difference of (a half of an inter-sample space)−1.

In the example of FIG. 8, four pixels lying at the corners of each unit area for pixel skip-reading-out are added up. For example, for a unit area for pixel skip-reading-out expressed as the leftmost uppermost rectangle outlined with bold lines, four green pixels G1 selected at intervals of the pitch of two pixels are added up and acquired. For a unit area for pixel skip-reading-out expressed as the uppermost second leftmost rectangle outlined with bold lines, four red pixels R1 selected at intervals of the pitch of two pixels are added up and acquired. For a unit area for pixel skip-reading-out expressed as the leftmost second uppermost rectangle outlined with bold lines, four blue pixels B1 selected at the pitch of two pixels are added up and acquired. For a unit area for pixel skip-reading-out expressed as the second leftmost second uppermost rectangle outlined with bold lines, four green pixels G2 selected at intervals of the pitch of two pixels are added up and acquired.

In the examples of FIG. 7 and FIG. 8, whatever unit area for pixel skip-reading-out is concerned, an average of the locations of four pixels to be added up approximately approaches to a barycenter of a unit area for pixel skip-reading-out. Consequently, the result of addition is thought appropriate as a value representative of the unit area for pixel skip-reading-out. Moreover, an MTF to be attained at the sample rate can be set to a relatively small value. Eventually, the adverse effect of an aliasing noise can be suppressed.

Referring to FIG. 7 and FIG. 8, pixels to be added up are selected at intervals of a pixel pitch that is smaller than a half of an inter-sample space. Alternatively, pixels to be added up may be selected at intervals of a pixel pitch that is larger than the half of the inter-sample space.

In the aforesaid embodiment, an image pickup device of a current reading type should be adopted in order to perform four-pixels addition. As mentioned previously, in the image pickup device of a current reading type, two scan lines and two data lines are activated simultaneously in order to read four pixels simultaneously and add them up.

However, an image pickup device of a voltage reading type may be adopted as an image pickup device. In this case, even if two data lines are activated simultaneously, two or more pixels lying on the same row or column cannot be selected and added up. When the image pickup device of a voltage reading type is adopted, if four-pixels addition is to be performed, four pixels must be read independently of one another. Namely, both pixel skip-reading-out and pixel addition cannot be achieved concurrently.

However, as long as the number of pixels to be added up is three, even if an image pickup device of a voltage reading type is adopted, three pixels can be selected simultaneously. An addition circuit for adding up three simultaneously-selected pixels is devised in order to achieve both pixel skip-reading-out and pixel addition concurrently. For three-pixels addition, the characteristic expressed as the aforesaid formula (2) cannot be exerted. Once a space between adjoining ones of pixels to be added up is made large enough, an MTF to be attained at the sample rate can be set to a relatively small value. Moreover, the space between adjoining ones of pixels to be added up should be even whatever the adjoining ones are. Moreover, two pixels lying on the same row or column should not be selected in order to permit adoption of the image pickup device of a voltage reading type.

Figure 10:
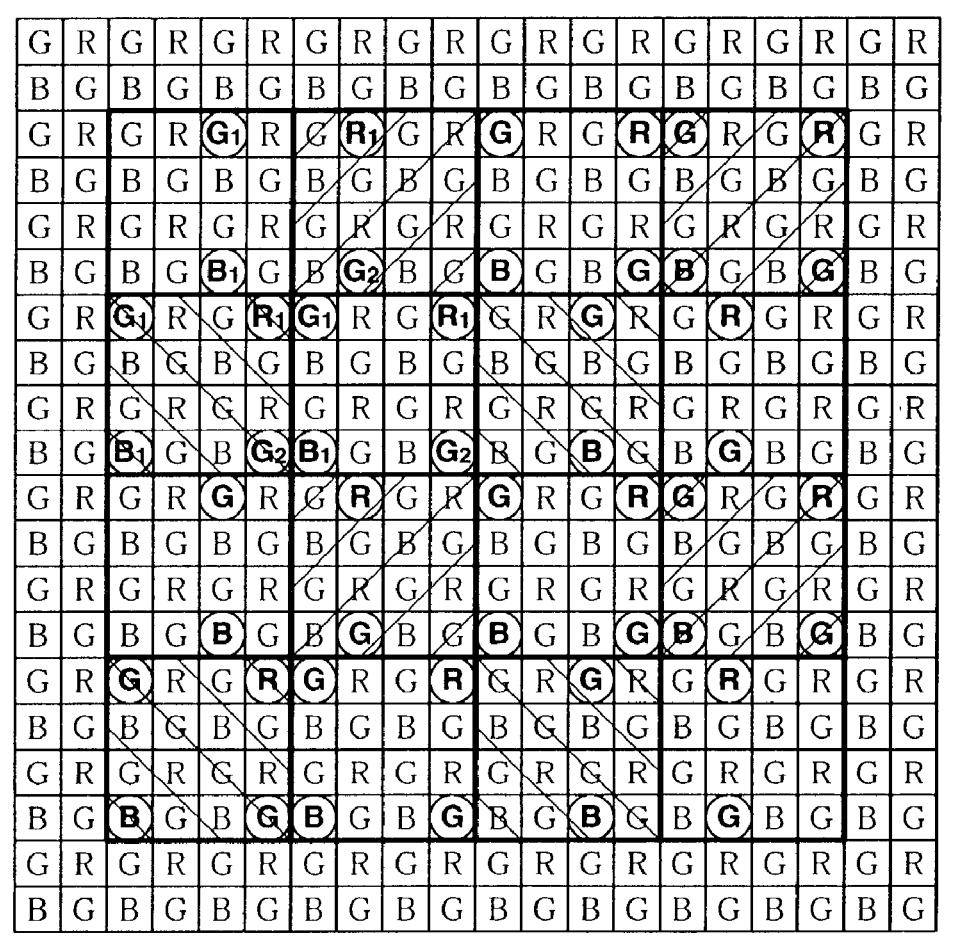
Figure 11:
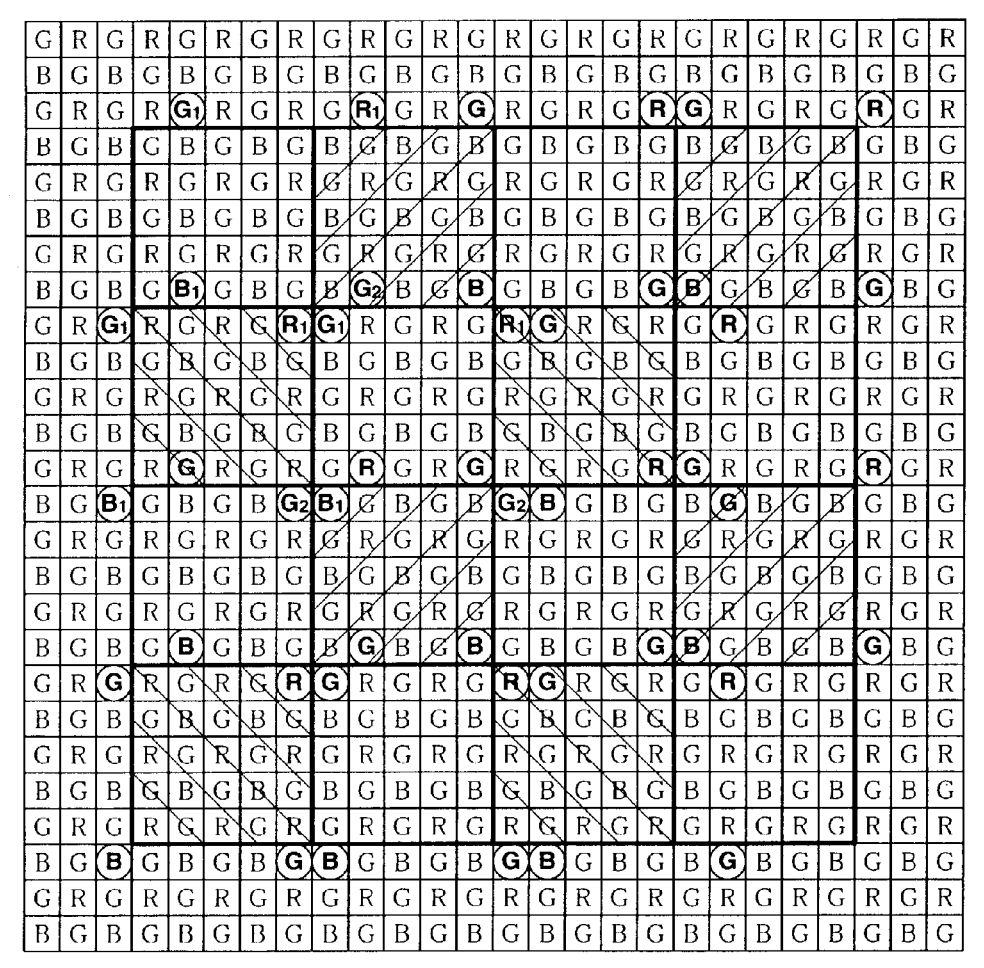

FIG. 9 to FIG. 11 are explanatory diagrams concerning a method of selection pixels needed for three-pixels addition among from pixels arrayed in the Bayer pattern. FIG. 9 to FIG. 11 adopt the same notation as FIG. 5 to FIG. 8 do.

FIG. 9 shows an example of pixels to be added up after selected at a pixel skip-reading-out rate of 3 (this pixel skip-reading-out may be referred to as one-third pixel skip-reading-out). Each rectangle outlined with bold lines in FIG. 9 expresses a unit area for pixel skip-reading-out containing a matrix of pixels arrayed in three rows and three columns. Pixel skip-reading-out is performed on every third pixel, that is, on a pixel lying in the perimeter of each unit area for pixel skip-reading-out expressed as a rectangle outlined with bold lines. Talking of pixels of each color produced in each unit area for pixel skip-reading-out, pixels of each color are selected at intervals of a pitch of six pixels.

In the example of FIG. 9, for example, for a unit area for pixel skip-reading-out expressed as the leftmost uppermost rectangle outlined with bold lines, three green pixels G1 are added up and acquired. For a unit area for pixel skip-reading-out expressed as the uppermost second leftmost rectangle outlined with bold lines, three red pixels R1 are added up and acquired. For a unit area for pixel skip-reading-out expressed as the leftmost second uppermost rectangle outlined with bold lines, three blue pixels B1 are added up and acquired. For a unit area for pixel skip-reading-out expressed as the second leftmost second uppermost rectangle outlined with bold lines, three green pixels G2 are added up and acquired.

Whatever unit area for pixel skip-reading-out is concerned, an average of the locations of three pixels to be added up approximately approaches to a barycenter of a unit area for pixel skip-reading-out. Moreover, a space between adjoining ones of pixels to be added up is substantially even. Pixels to be added can be thought appropriate as values representative of each unit area for pixel skip-reading-out, and the space between adjoining ones of the pixels is large enough. Consequently, the result of addition will lead to a sufficient reduction in an MTF to be attained at the sample rate. Eventually, the adverse effect of an aliasing noise can be suppressed. Moreover, three pixels to be added up are not located on the same column. Therefore, even when the image pickup device of a voltage addition type is adopted, three pixels can be selected simultaneously.

FIG. 10 shows an example of pixels to be added up after being selected at a pixel skip-reading-out rate of 4 (this pixel skip-reading-out may be referred to as quarter pixel skip-reading-out). Each rectangle outlined with bold lines in FIG. 10 expresses a unit area for pixel skip-reading-out containing a matrix of pixels arrayed in four rows and four columns. Pixel skip-reading-out is performed on every fourth pixel, that is, on a pixel lying in the perimeter of each unit area for pixel skip-reading-out expressed as a rectangle outlined with bold lines. Talking of pixels of each color produced in each unit area for pixel skip-reading-out, pixels of each color are selected at intervals of a pitch of eight pixels.

In the example of FIG. 10, for example, for a unit area for pixel skip-reading-out expressed as the leftmost uppermost rectangle outlined with bold lines, three green pixels G1 are added up and acquired. For a unit area for pixel skip-reading-out expressed as the uppermost second leftmost rectangle outlined with bold lines, three red pixels R1 are added up and acquired. For a unit area for pixel skip-reading-out expressed as the leftmost second uppermost rectangle outlined with bold lines, three blue pixels B1 are added up and acquired. For a unit area for pixel skip-reading-out expressed as the second leftmost second uppermost rectangle outlined with bold lines, three green pixels G2 are added up and acquired.

Whatever unit area for pixel skip-reading-out is concerned, an average of the locations of three pixels to be added up approximately approaches to a barycenter of a unit area for pixel skip-reading-out. Moreover, a space between adjoining ones of pixels to be added up is substantially even. Pixels to be added up are thought appropriate as a value representative of a unit area for pixel skip-reading-out, and the space between adjoining ones of the pixels is large enough. Consequently, the result of addition leads to a sufficient reduction in an MTF to be attained at the sample rate. Eventually, the adverse effect of an aliasing noise can be suppressed. Moreover, three pixels to be added are not located on the same column. Therefore, even when an image pickup device of a voltage addition type is adopted, three pixels can be selected simultaneously.

FIG. 11 shows an example of pixels to be added up after being selected at a pixel skip-reading-out rate of 5 (this pixel skip-reading-out may be referred to as one-fifth pixel skip-reading-out). Each rectangle outlined with bold lines in FIG. 11 expresses a unit area for pixel skip-reading-out containing a matrix of pixels arrayed in five rows and five columns. Pixel skip-reading-out is performed on every fifth pixels, that is, on a pixel lying in the perimeter of each unit area for pixel skip-reading-out expressed as a rectangle outlined with bold lines. Talking of pixels of each color produced in each unit area for pixel skip-reading-out, pixels of each color are selected at intervals of a pitch of ten pixels.

In the example of FIG. 11, for example, for a unit area for pixel skip-reading-out expressed as the leftmost uppermost rectangle outlined with bold lines, three green pixels G1 are added up and acquired. For a unit area for pixel skip-reading-out expressed as the uppermost second leftmost rectangle outlined with bold lines, three red pixels R1 are added up and acquired. For a unit area for pixel skip-reading-out expressed as the leftmost second uppermost rectangle outlined with bold lines, three blue pixels B1 are added up and acquired. For a unit area for pixel skip-reading-out expressed as the second leftmost second uppermost rectangle outlined with bold lines, three green pixels G2 are added up and acquired.

Whatever unit area for pixel skip-reading-out is concerned, an average of the locations of three pixels to be added approximately approaches to a barycenter of a unit area for pixel skip-reading-out. Moreover, a space between adjoining ones of pixels to be added is substantially even. Pixels to be added up are thought to be values representative of a unit area for pixel skip-reading-out, and the space between adjoining ones of the pixels is large enough. Consequently, the result of addition would lead to a sufficient reduction in an MTF to be attained at the sample rate. Eventually, the adverse effect of an aliasing noise can be suppressed. Moreover, three pixels to be added up are not located on the same column. Therefore, even when an image pickup device of a voltage addition type is adopted, three pixels can be selected simultaneously.

As far as half pixel skip-reading-out is concerned, two pixels on the same column must be read simultaneously in order to perform three-pixels addition. When an image pickup device of a voltage reading type is adopted, if half pixel skip-reading-out must be performed, two-pixels addition is adopted.

Figures 12, 13A, 13B:
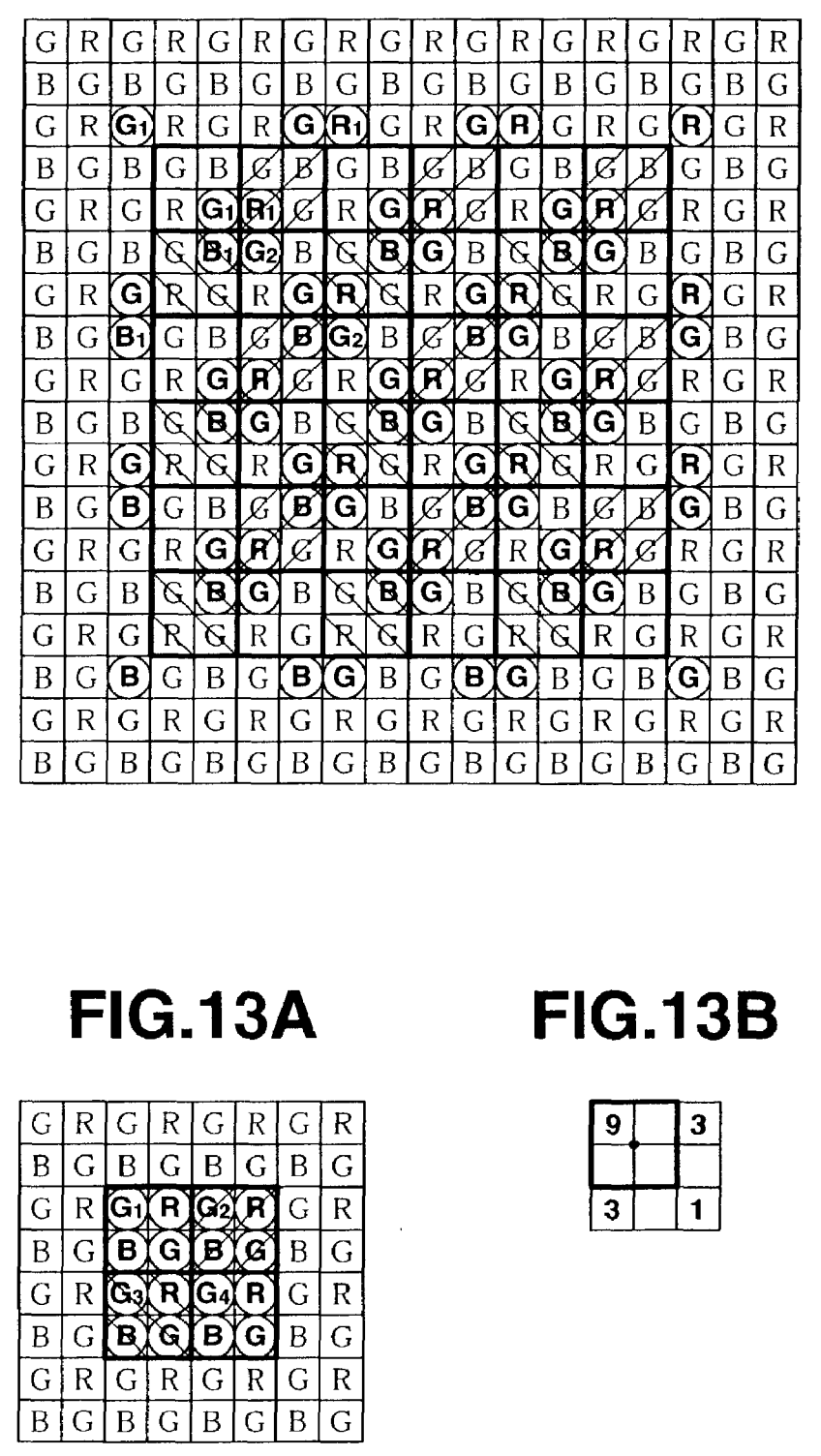

FIG. 12 is an explanatory diagram concerning a method of selecting pixels required for two-pixels addition from among pixels arranged in the Bayer pattern. Referring to FIG. 12, the same notation as that employed in FIG. 5 to FIG. 8 is adopted.

FIG. 12 shows an example of pixels to be added after being selected at a pixel skip-reading-out rate of 2 (this pixel skip-reading-out may be referred to as half pixel skip-reading-out). Each rectangle outlined with bold lines in FIG. 12 expresses a unit area for pixel skip-reading-out containing a matrix of pixels arrayed in two rows and two columns. Pixel skip-reading-out is performed on every other pixel, that is, on a pixel lying in the perimeter of each unit area for pixel skip-reading-out expressed as a rectangle outlined with bold lines. Talking of pixels of each color produced in each unit area for pixel skip-reading-out, pixels of each color are selected at intervals of a pitch of four pixels.

In the example of FIG. 12, for example, for a unit area for pixel skip-reading-out expressed as the leftmost uppermost rectangle outlined with bold lines, two green pixels G1 are added up and acquired. Moreover, for a unit area for pixel skip-reading-out expressed as the uppermost second leftmost rectangle outlined with bold lines, two red pixels R1 are added up and acquired. For a unit area for pixel skip-reading-out expressed as the leftmost second uppermost rectangle outlined with bold lines, two blue pixels B1 are added up and acquired. For a unit area for pixel skip-reading-out expressed as the second leftmost second uppermost rectangle outlined with bold lines, two green pixels G2 are added up and acquired.

Whatever unit area for pixel skip-reading-out is concerned, an average of the locations of two pixels to be added up approximately approaches to a barycenter of a unit area for pixel skip-reading-out. Moreover, a space between adjoining ones of pixels to be added up is substantially even. Pixels to be added up are thought to be values representative of a unit area for pixel skip-reading-out, and the space between adjoining ones of the pixels is large enough. Consequently, the result of addition leads to a sufficient reduction in an MTF to be attained at the sample rate. Eventually, the adverse effect of an aliasing noise can be suppressed. Moreover, two pixels to be added up are not located on the same column. Therefore, even if an image pickup device of a voltage addition type is adopted, two pixels can be selected simultaneously.

According to the foregoing method of selecting pixels to be added up, an average of the locations of pixels to be added up may not agree with a barycenter of a unit area for pixel skip-reading-out. The system controller 6 may weight pixels to be added according to the pixel locations in the solid-state image pickup device 2. Thus, the average of the locations of the pixels to be added up may be spatially corrected to agree with the barycenter of the unit area for pixel skip-reading-out.

Figures 14A, 14B:
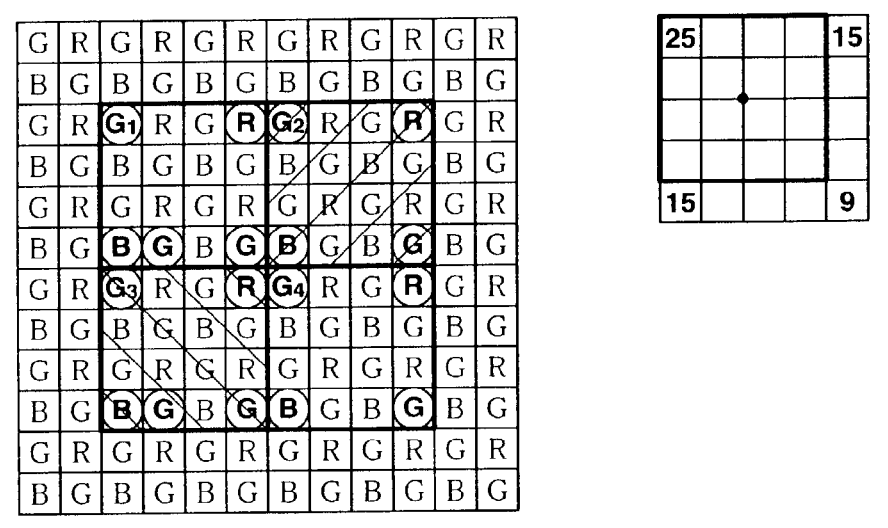

FIG. 13A, FIG. 13B, FIG. 14A, and FIG. 14B are explanatory diagrams showing examples of the above case. FIG. 13A and FIG. 13B show an example of four-pixels addition for half pixel skip-reading-out. FIG. 13A is an explanatory diagram showing an example of four-pixels addition for half pixel skip-reading-out. FIG. 13B is an explanatory diagram showing weighting to be performed on pixels selected as shown in FIG. 13A. FIG. 14A is an explanatory diagram showing an example of four-pixels addition for quarter pixel skip-reading-out. FIG. 14 is an explanatory diagram concerning weighting to be performed on pixels selected as shown in FIG. 14A. FIG. 13A to FIG. 14B adopt the same notation as FIG. 5 and FIG. 6 do.

During half pixel skip-reading-out, as shown in FIG. 13A, for a unit area for pixel skip-reading-out expressed as the leftmost uppermost rectangle, four pixels G1 to G4 are selected at intervals of a pitch of two pixels (pixels Gi in FIG. 6) and added up. In this case, as shown in FIG. 13B, the pixels G1 to G4 are weighted at a ratio of 9:3:3:1.

By applying the weight coefficients of which ratio is 9:3:3:1, the location of the result of pixel addition is corrected to agree with a barycenter of a unit area for pixel skip-reading-out (marked with a black dot in FIG. 13B).

During quarter pixel skip-reading-out, as shown in FIG. 14A, for example, for a unit area for pixel skip-reading-out expressed as the leftmost uppermost rectangle, four pixels G1 to G4 (pixels G1 in FIG. 5) are selected at intervals of a pitch of four pixels and added up. In this case, as shown in FIG. 14B, the pixels G1 to G4 are weighted at a ratio of 25:15:15:9.

By applying the weight coefficients of which ratio is 25:15:15:9, the location of the result of pixel addition is corrected to agree with the barycenter of the unit area for pixel skip-reading-out (marked with a black dot in FIG. 14B).

Figure 15:
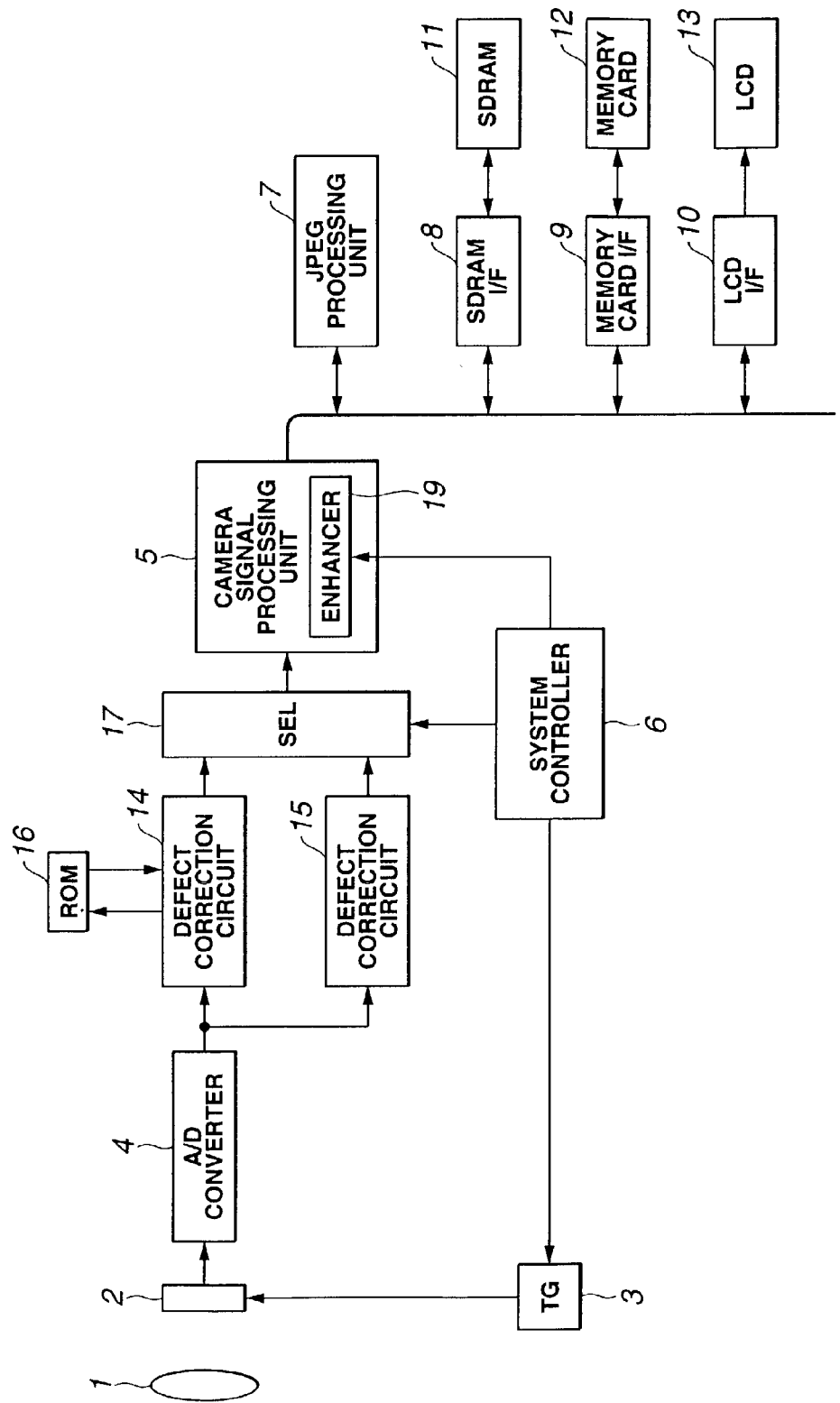
FIG. 15 is a block diagram showing an image pickup apparatus in accordance with the second embodiment of the present invention.
Figure 16B:
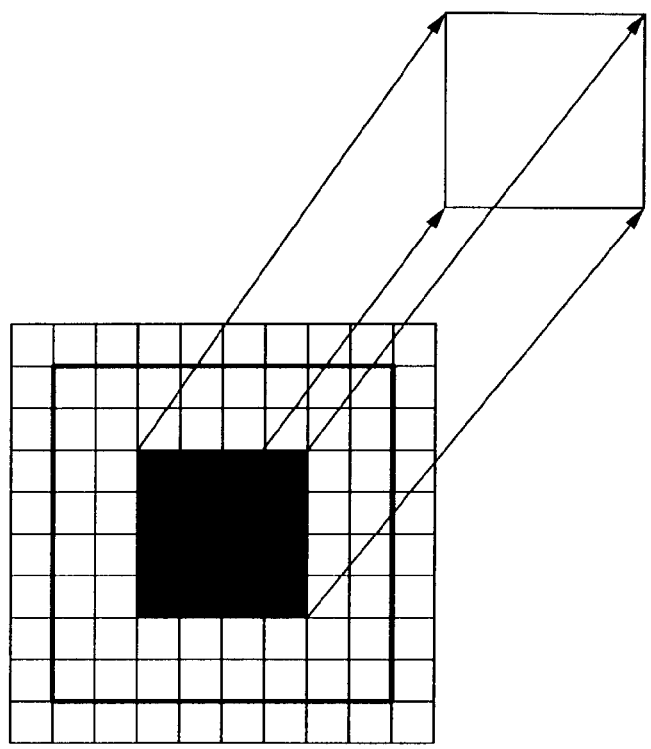
FIG. 16A and FIG. 16B are explanatory diagrams concerning pixel skip-reading-out in which a related art is implemented.
Figure 16A:
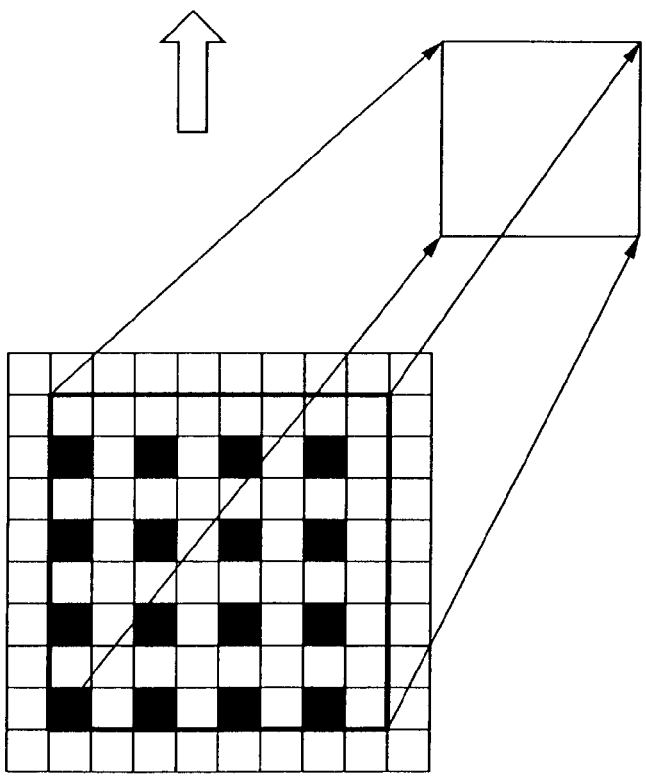

FIG. 15 is a block diagram showing an image pickup apparatus in accordance with the second embodiment of the present invention. Referring to FIG. 15, the same reference numerals are assigned to the components identical to those shown in FIG. 1. The present embodiment makes it possible to correct a defect resulting from pixel addition.

The present embodiment is different from the first embodiment in a point that defect correction circuits 14 and 15, a ROM 16, and a selection circuit (SEL) 17 are additionally included.

An output of the A/D converter 4 is transferred to the defect correction circuits 14 and 15. The address of a defective pixel location in the solid-state image pickup device is stored in the ROM 16. When all the pixel locations in the solid-state image pickup device 2 are used to define an image pickup area, a signal of a defective pixel contained in the output of the A/D converter 4 is corrected based on the address of a defective pixel location stored in the ROM 16. The resultant signal of the defective pixel is then transferred.

When pixels are skip-read out the solid-state image pickup device 2, the defect correction circuit 15 detects a defective pixel from the image signal of the pixels and corrects it. For example, when a signal of a received pixel exhibits a marked change to other pixels, the defect correction circuit 15 judges that the received pixel is a defective pixel and corrects it in consideration of preceding and succeeding pixel values.

The selection circuit 17 selectively transfers the outputs of the defect correction circuits 14 and 15 to the camera signal processor 5 under the control of the system controller 6. Under the control of the system controller 6, the camera signal processor 5 changes a magnitude of enhancement to be performed by an enhancer 19 according to the effective aperture of an image composed of added pixels.

In the present embodiment having the foregoing components, if all the pixel locations in the solid-state image pickup device 2 are used to define an image pickup area, a read image signal is converted into a digital form by the A/D converter 4. The resultant signal is then transferred to the defect correction circuit 14. The defect correction circuit 14 reads the address of a defective pixel location from the ROM 16, and corrects a defective pixel contained in the received image signal. In this case, the selection circuit 17 transfers an output of the defect correction circuit 14 to the camera signal processor 5 under the control of the system controller 6.

In a zoom mode in which pixel skip-reading-out is performed, an image signal read from the solid-state image pickup device 2 is transferred to the defect correction circuit 15 via the A/D converter 4. The defect correction circuit 15 detects a defective pixel by finding out a variation of the image signal, and spatially or temporally corrects the defective pixel using preceding and succeeding pixels. In this case, the selection circuit 17 selects an output of the defect correction circuit 15 and transfers the output to the camera signal processor 5.

The camera signal processor 5 controls a magnitude of enhancement to be performed on a received image signal under the control of the system controller 6. For example, an MTF to be attained at a sample rate sometimes is not 0 depending on the effective aperture of an image composed of added pixels. In this case, the camera signal processor 5 uses the enhancer 19 to control a magnitude by which a high-frequency component is enhanced. Eventually, the MTF becomes acceptable.

The other operations are identical to those exerted by the first embodiment.

As mentioned above, the present embodiment provides the same advantages as the first embodiment does. Moreover, the present embodiment gains an advantage over the first embodiment in that a defect can be corrected despite the simple configuration. Moreover, it is unnecessary to include a defect ROM for the purpose of pixel skip-reading-out. Besides, a solid-state image pickup device need not be adjusted in order to implement defect correction. Moreover, a magnitude of enhancement of a high-frequency component is controllable. Consequently, image quality can be stabilized irrespective of a pixel skip-reading-out rate.

As described so far, according to the present invention, even when pixels are skip-read out from a solid-state image pickup device, deterioration in image quality can be suppressed. Even when pixel addition is performed in order to prevent the deterioration in image quality stemming from pixel skip-reading-out, a change in a sensitivity can be avoided.

Having described the preferred embodiments of the present invention by referring to the accompanying drawings, it should be understood that the present invention is not limited to those precise embodiments, but that a person skilled in the art could make various changes and modifications on the invention without departing from the spirit or scope of the invention defined in the appended claims.

What is claimed is:

1. An image pickup apparatus comprising:
   a solid-state image pickup device having a plurality of photoelectric converting elements arrayed in two dimensions and enabling pixels to be skip-read out and read from said photoelectric converting elements;
   a controller that defines an image pickup area in the solid-state image pickup device based on a zooming rate, and that determines a pixel skip-reading-out rate based on a size of the image pickup area; and
   a reading means that adds up a plurality of pixels, when pixels are skip-read out and read from said photoelectric converting elements, to acquire a value representative of a unit area for pixel skip-reading-out wherein the size of the unit area is defined based on the pixel skip-reading-out rate determined by the controller.

2. The image pickup apparatus according to claim 1, further comprising an enhancing means that controls a magnitude of enhancement to be performed on a high-frequency component according to the effective aperture of an image composed of pixels read by said reading means.

3. The image pickup apparatus according to claim 1, further comprising a defect correcting means that detects a defective pixel from among pixels read by said reading means and corrects the defective pixel.

4. The image pickup apparatus according to claim 3, wherein said defect correcting means corrects a defective pixel according to the address of a defective pixel location stored in advance in a storage device.

5. The image pickup apparatus according to claim 3, wherein said defect correcting means detects and corrects a defective pixel using an image signal read from said solid-state image pickup device.

6. The image pickup apparatus according to claim 3, wherein: when all the pixel locations in said solid-state image pickup device are used to define an image pickup area, said defect correcting means corrects a defective pixel according to the address of a defective pixel location stored in advance in a storage device; and in a zoom mode in which pixel skip-reading-out is performed, said defect correcting means detects and corrects a defective pixel using an image signal read from said solid-state image pickup device.

7. An image pickup apparatus comprising:
- a solid-state image pickup device having a plurality of photoelectric converting elements arrayed in two dimensions and enabling pixels to be skip-read out and read from said photoelectric converting elements; and
- a reading means that adds up a plurality of pixels, when pixels are skip-read out and read from said photoelectric converting elements, to acquire a value representative of a unit area for pixel skip-reading-out defined based on a pixel skip-reading-out rate,
- wherein said reading means acquires the value representative of a unit area for pixel skip-reading-out by adding up the same number of pixels irrespective of the pixel skip-reading-out rate.

8. The image pickup apparatus according to claim 7, wherein said reading means selects pixels to be added so that an average of the locations of the plurality of pixels to be added up will approach to a barycenter of a unit area for pixel skip-reading-out.

9. The image pickup apparatus according to claim 7, wherein said reading means sets a space between adjoining ones of pixels to be added up to a half of an inter-sample space or a difference of (a half of an inter-sample space)−1.

10. The image pickup apparatus according to claim 7, wherein said reading means sets the number of pixels to be added to 4.

11. The image pickup apparatus according to claim 7, wherein said reading means sets the number of pixels to be added to 3, and selects three pixels from different columns in said solid-state image pickup device.

12. The image pickup apparatus according to claim 7, wherein when the pixel skip-reading-out rate is 3, said reading means sets the number of pixels to be added up to 3.

13. The image pickup apparatus according to claim 7, wherein when the pixel skip-reading-out rate is 2, said reading means sets the number of pixels to be added up to 2.

14. The image pickup apparatus according to claim 7, wherein said reading means applies weight coefficients to pixels to be added up so that the location of the result of addition will approach to a barycenter of a unit area for pixel skip-reading-out.

* * * * *